(12) United States Patent
Pereverzev

(10) Patent No.: US 11,948,543 B1
(45) Date of Patent: Apr. 2, 2024

(54) COMPUTER-IMPLEMENTED METHOD AND SYSTEM FOR EDITING MUSICAL SCORE

(71) Applicant: MUSE CY LIMITED, Mesa Geitonia (CY)

(72) Inventor: Vasilij Pereverzev, Ghent (BE)

(*) Notice: Subject to any disclaimer, the term of this patent is extended or adjusted under 35 U.S.C. 154(b) by 0 days.

(21) Appl. No.: 18/064,735

(22) Filed: Dec. 12, 2022

(51) Int. Cl.
*G10H 1/00* (2006.01)

(52) U.S. Cl.
CPC ......... *G10H 1/0025* (2013.01); *G10H 1/0033* (2013.01); *G10H 2220/106* (2013.01)

(58) Field of Classification Search
CPC .............. G10H 1/0025; G10H 1/0033; G10H 2220/106
See application file for complete search history.

(56) References Cited

U.S. PATENT DOCUMENTS

| | | | | |
|---|---|---|---|---|
| 6,740,802 B1 * | 5/2004 | Browne, Jr. | ......... | G10H 1/0025 84/622 |
| 7,453,035 B1 * | 11/2008 | Evans | .................. | G10H 1/0025 84/613 |
| 7,612,279 B1 * | 11/2009 | Schnepel | ............. | G10H 1/0025 84/622 |
| 7,750,224 B1 * | 7/2010 | Rav-Niv | ................ | G09B 15/00 84/485 R |
| 8,378,194 B2 * | 2/2013 | Daisy | ....................... | G09B 5/06 84/649 |
| 10,008,188 B1 * | 6/2018 | Dabon | ..................... | G10G 1/04 |
| 10,657,934 B1 * | 5/2020 | Kolen | .................. | G10H 1/0025 |
| 11,183,160 B1 * | 11/2021 | Lerman | ..................... | G10H 1/06 |
| 2006/0254407 A1 * | 11/2006 | Jarrett | ...................... | G10H 1/08 84/601 |
| 2009/0301287 A1 * | 12/2009 | Harvey | ................ | G10H 1/0025 84/609 |
| 2011/0023688 A1 * | 2/2011 | Daisy | .................. | G10H 1/0008 84/483.1 |
| 2013/0133506 A1 * | 5/2013 | Daisy | ..................... | G09B 15/00 84/483.2 |

(Continued)

FOREIGN PATENT DOCUMENTS

GB        2509552 A  *  7/2014  ......... G06F 3/04883
WO    WO-2017195106 A1 * 11/2017

*Primary Examiner* — Jeffrey Donels
(74) *Attorney, Agent, or Firm* — RC Trademark Company

(57) ABSTRACT

In general terms the present disclosure proposes a computer-implemented method for editing a digital musical score. The computer-implemented method comprises receiving, by at least one processor, the digital musical score that is to be edited, wherein the digital musical score includes musical notations associated with at least one musical instrument in vertical alignment. Moreover, the computer-implemented method comprises receiving a first input indicative of one of: creation of a new section in the digital musical score, selection of a previously-created section in the digital musical score, via an interactive user interface rendered on a user device associated with a user. Furthermore, the computer-implemented method comprises receiving a second input indicative of an edit required in the new section or in the previously-created section, via the interactive user interface and modifying, using the at least one processor, the digital musical score for implementing the edit in the new section or in the previously-created section.

15 Claims, 4 Drawing Sheets

(56) References Cited

U.S. PATENT DOCUMENTS

| | | | |
|---|---|---|---|
| 2013/0233154 A1* | 9/2013 | Little | G10H 7/008 |
| | | | 84/609 |
| 2015/0095822 A1* | 4/2015 | Feis | G06F 3/04842 |
| | | | 715/765 |
| 2015/0228259 A1* | 8/2015 | Valente | G06F 18/00 |
| | | | 84/483.2 |
| 2016/0210947 A1* | 7/2016 | Rutledge | G10G 1/04 |
| 2018/0182362 A1* | 6/2018 | Li | G10H 1/0025 |
| 2018/0268792 A1* | 9/2018 | Serletic | G10H 1/0025 |
| 2019/0237051 A1* | 8/2019 | Silverstein | G06N 7/01 |
| 2023/0032765 A1* | 2/2023 | Plazak | G06F 3/03545 |

* cited by examiner

US 11,948,543 B1

COMPUTER-IMPLEMENTED METHOD AND SYSTEM FOR EDITING MUSICAL SCORE

TECHNICAL FIELD

This disclosure relates to notation applications. In particular, though not exclusively, this disclosure relates to a computer-implemented method for editing a digital musical score, a system for editing a digital musical score, and a computer program product for editing a digital musical score.

BACKGROUND

Over the past few decades, the process of creation of a music composition or a musical score has changed massively. Traditionally, while preparing a song, a music composer used to write the musical score by hand. Moreover, the music composer used to write a main score and an individual part score by hand when writing for ensembles of three or more players. Notably, with the advancement in technology, various notation applications have been used to make the process of musical composition much easier and faster than the traditional practice of writing by hand. Furthermore, the innovation in digital notation has enabled notation applications to automatically generate part scores, based on the main score created by the composer.

Conventionally, some notation applications enable composers to use multiple formatting tools to make changes directly to a digital music score and create a desired visual result manually. For example, if the composer wishes to create a layout that acts as a new section, they should select a measure on their digital music score and apply an operation called 'Page break', which creates space on a new page. The composer then needs to manually make each desired change. Herein, the changes may include formatting of the visual appearance of the digital music score, setting the bar numbers back to zero, hide instruments, and so forth. Moreover, all other relevant considerations that must be taken into account when creating the new section must then be completed manually by the composer. However, such conventionally available notation applications come with the significant disadvantage of being complicated, unintuitive, time consuming and with no automatic layout possibilities that would save the composer's time.

Generally, some of the notation applications require the composer to create numerous similar manual layout changes on the main score as well as on each of the part scores in order to achieve the desired result. Moreover, some of the notation applications do not have features that allow the composer to specify whether a given musical work has multiple segments, such as movements, scenes or individual songs. In an example, the said problem is compounded during an opera, when the instrumentation and number of singers differ from one scene to another scene. Additionally, during an operatic work, when the ability to specify the multiple segments is not available, composers using such notation applications will need to create a different project file for each scene, resulting in multiple part scores per music player, which then need to be stitched together using an application like Adobe Reader. Thus, such notation applications are highly time-consuming and extremely unforgiving if the composer subsequently wants to make a stylistic change or a change to instrumentation, which necessities duplicating the change across all multiple projects, followed by another export operation for all the part scores, followed by another round of stitching the part scores together.

Additionally, there exist some of the notation applications that include a concept of separate spans of music that are completely independent in musical content In this regard, the music composers may add or remove the separate spans of music from the digital musical score using a set-up screen. However, the set-up screen is an abstract setup screen, thereby resisting such notation applications from being user-friendly.

It is an object of the disclosure to address at least one of the above problems, or another problem associated with the prior art.

SUMMARY OF THE DISCLOSURE

A first aspect of the disclosure provides a computer-implemented method for editing a digital musical score, the method comprising receiving, by at least one processor, the digital musical score that is to be edited, wherein the digital musical score includes musical notations associated with at least one musical instrument in vertical alignment, receiving a first input indicative of one of: creation of a new section in the digital musical score, selection of a previously-created section in the digital musical score, via an interactive user interface rendered on a user device associated with a user, receiving a second input indicative of an edit required in the new section or in the previously-created section, via the interactive user interface and modifying, using the at least one processor, the digital musical score for implementing the edit in the new section or in the previously-created section.

Suitably, the method enables the editing of a digital musical score in an easier and intuitive way. It will be appreciated that the method enables the user to customize the digital musical score based on the requirement thereof, thereby reducing the cognitive load therefrom. Moreover, the method is interactive and enables the user to interact directly with the digital musical score without being physically distracted. Advantageously, the method is robust and time efficient.

Herein, the user refers to a person using the method for editing the digital musical score. Optionally, the user may be a musician, an instrumentalist, a music learner or any ordinary person. Herein, the user interface (UI) refers to the space where interactions between the user and a user device occur to allow effective operation and control of the user device from the user end, while the machine simultaneously feeds back information that aids the operators' decision-making process. Suitably, the user interface is interactive and thus enables the user to operate the user device in an easy, efficient, and user-friendly way to produces the desired result. It will be appreciated that the user interface enables the user to provide minimal input to achieve the desired output. Moreover, the user interface comprises various user interface elements. Herein, the user device refers to an electronic device such as a laptop, a computer, a tablet, a smartphone, and so forth.

Herein, the term "digital musical score" refers to a digitally stored and digitally visualized form of a musical notation that uses musical symbols to indicate a plurality of pitches, rhythms, or chords of a song or an instrumental musical piece. Optionally, the digital musical score may also include lyrics associated with the digital musical score, a title of the digital musical score, a composer of the digital musical score, and so forth. Optionally, the digital musical score includes musical notations associated with at least one musical instrument and arranged in the vertical alignment. Optionally, the at least one musical instrument may be a flute, a clarinet, a bassoon, a trumpet, a tuba, a piano, a violin, a cello, and so forth. Optionally, the at least one instrument may be an interface such as a keyboard interface, a stringed instrument interface, and a percussion interface. In this regard, the method enables providing a representation of a musical note for the at least one instrument in the digital musical score. Optionally, the at least one instrument interface may include a touch screen interface.

In some embodiments, the digital musical score is a part score or a full score.

Herein, the part score refers to the digital musical score that is used to display one or more musical instruments (most commonly one) to the player while performing the digital musical score. It will be appreciated that the part score eliminates the unnecessary noise during the musical performance. Beneficially, the use of the part score may save the user from physical distractions such as turning pages of a physical sheet of musical score during the musical performance, thereby increasing the efficiency of the user. Optionally, the part score may include two or more musical instruments. Herein, the full score refers to the digital musical score that is used by a conductor while directing the simultaneous performance of several players playing a plurality of music instruments such as the piano, the flute, the clarinet, and so forth. Optionally, the full score may be used by another user such as a researcher or a composer who may want to review the full score. Notably, the main score includes the musical notation of the plurality of performing music instruments.

It will be appreciated that the method enables the editing of the part score as well as the full score based on the requirement thereof. Suitably, the ability to make changes directly to the part score or the full score enables the music composers to achieve a desired result in the place where they want those changes to occur. Now, in order to enable the said changes firstly, the method comprises receiving, by at least one processor, the digital musical score that is to be edited.

Suitably, the method employs at least one processor for receiving the digital musical score. The term "at least one processor" as used herein refers to an application, program, process or device that responds to requests for information or services by another application, program, process or device (such as the external device) via a network interface. Optionally, the at least one processor also encompasses software that makes the act of serving information or providing services possible. It will be appreciated that optionally the processor includes, but is not limited to, a microprocessor, a microcontroller, a complex instruction set computing (CISC) microprocessor, a reduced instruction set computer (RISC) microprocessor, a very long instruction word (VLIW) microprocessor, or any other type of processing circuit.

In some embodiments, the step of receiving the digital musical score comprises:
creating the digital musical score, based on at least one third input provided by the user; or
receiving the digital musical score from a device at which the digital musical score is stored.

In this regard, the method supports creation of the digital musical scores based on the at least one third input or fetching of previously-created digital musical scores. In an example, the user interface associated with the method may include a library which includes a list of previously-created digital musical scores that can be received for editing.

Herein, the at least one third input refers to an instruction or a command given to a user interface element to perform a function associated therewith. Optionally, the user may provide the at least one third input such as clicking, selecting, feeding an input value, and so forth, for creating the digital musical score. For example, the at least one third input may be clicking on a create new score icon, feeding the digital musical score information, selecting a template file, selecting at the at least one instrument, selecting a key signature, selecting a time signature, and so forth, for creating the digital musical score. In an implementation, the method may enable the user to provide the at least one third input for choosing a template of the digital musical score that is stored in the user interface. It will be appreciated that the method enables the editing of the created digital musical score. Moreover, the method enables the editing of the digital musical score that is received from the device at which the digital musical score is stored. Optionally, the device may be an external device such as a cloud server, a computer, a mobile phone, a data repository, an external storage device, and so forth. In this regard, the device may be operable to store the digital musical score that is previously-created by the user or another user. Optionally, the previously-created musical store may include one or more edited versions thereof. In an implementation, the step of receiving the digital musical score includes downloading the digital musical score from the device. Optionally, the method may enable the user to upload the digital musical score on the device.

The terms "first input" and "second input" as used herein refers to a result that is achieved from an instruction or signal given by the user, causing the user interface element to perform a function thereof. Herein, a new section refers to a musical idea or the musical composition. Optionally, the types of sections may include an introduction or intro, an exposition, a development, a recapitulation, a verse, a chorus or refrain, a conclusion, a coda or outro, a fadeout, a bridge or an interlude. For example, the digital musical score includes the combination of the sections. In an example, the new section may be created for updating, changing or improving the digital musical score to a better version thereof. The term "previously-created section" as used herein refers to a section that is stored in the user interface. The method comprises receiving the first input indicative of one of: creation of a new section in the digital musical score, selection of the previously-created section in the digital musical score, via the interactive user interface rendered on the user device associated with the user. In this regard, the method enables the user to create the new section in the digital musical score via the interactive user interface rendered on the user device as a result of the first input. Moreover, the first input is used for selection of the previously-created section in the digital musical score via the interactive user interface rendered on the user device.

In some embodiments, the first input is at least one of: a selection of a user interface element, inputted values in a user interface element, a partition element drawn over the digital musical score. Optionally, the user interface element may be a command button, a check box, a drop-down menu, a dialog box, a graphical widget, a plurality of buttons, a plurality of list boxes, a plurality of toggles, an image, an editable part of an image, an icon, a plurality of input fields, a slider, a plurality of tags, a sub-window, a tab, and so forth. In an implementation, the user may create the new section by clicking on the command button for the same. Optionally, the method may enable the user to select one or more measures of the previously-created section to select the previously-created section. Moreover, the method includes receiving the first input in the form of the input value in the user interface element. In an implementation, the method enables the user interface to receive the first input such as selecting the user interface element named as 'sections' to create a new section or edit an existing section on the digital musical score. In an example, the method may include receiving the input values such as a start time and an end time of the new section of the digital musical score that is to be created in the user interface element such as the dialog box. In another example, the method may include receiving the input values such as a name of the at least one instrument that is to be selected in the user interface element of the previously-created section. Furthermore, the first input is the partition element drawn over the digital musical score. For example, the method may enable the user to draw the partition on the digital musical score to create the new section or select the previously-created section.

The method comprises receiving the second input indicative of the edit required in the new section or in the previously-created section, via the interactive user interface. Suitably, the method enables the editing of the new section of the digital musical score by using the interactive user interface. In this regard, the method comprises receiving the second input which is indicative of the edit required in the new section. In an implementation, the step of receiving the second input may enable the user to directly interact with the new section of the digital musical score. For example, the second input enables the user to specify the at least one instrument that should appear in the new section. Moreover, the method enables receiving the second input indicative of the edit required in the previously-created section of the digital musical score, thereby allowing the users to create the highly detailed full scores and/or part scores.

In some embodiments, the second input is at least one of: a selection of a user interface element, a drag and drop of a user interface element, inputted values in a user interface element. In an implementation, when the digital musical score comprises multiple sections then the method enables the users to select any measure within a new section to select that section. Herein, the measure refers to a single unit of time featuring a specific number of beats played at a particular tempo. Optionally, the user may then use an instruments panel to determine the specific instrumentation for the selected section. Optionally, the method enables the user to receive the second input such as dragging the previously-created section of the part score using the corresponding user interface element and dropping the previously-created section in the delete user interface element.

In some embodiments, the edit required in the new section or in the previously-created section comprises at least one of: addition of notations associated with a musical instrument, removal of notations associated with a musical instrument, modification of notations associated with a musical instrument, rearrangement of an order of musical instruments in the vertical alignment, adjustment of a spacing between notations of different musical instruments in the vertical alignment. Suitably, the method enables the editing of the digital musical score in a manner that does not require an enormous amount of adjustment and manual layout work to achieve the desired visual result.

In some embodiments, the editing feature allow users to add or remove the new section or the previously-created section and take advantage of any kind of automation of part layouts. Optionally, the addition of notations associated with a musical instrument includes transposition of notations, addition of repetitions, addition of jumps, changing or customizing or connecting measures and addition of grace notes. Optionally, the removal of notations associated with a musical instrument includes removal of repetitions, removal of jumps, removal of grace notes, and so forth. For example, the users may open an individual part score and specify the at least one instrument required therein. Now, in order to achieve the aforementioned result, the method enables the user to select the desired section and enable (or disable) the at least one instrument required in the section.

In some embodiments, the edit required in the new section or in the previously-created section comprises modification of notations associated with a musical instrument. Suitably, the modification of notations enables clear printing of music symbols with no overlapping of different signs. Optionally, the notations may be modified to even out the music symbol size and density, and to reduce redundant space. Optionally, the modification of notations includes changing a font style thereof. Optionally, in order to edit the font style the user may require to first apply a new typeface and a notation style in the dialogue box.

In some embodiments, the edit required in the new section or in the previously-created section comprises the rearrangement of the order of musical instruments in the vertical alignment. Suitably, the method allows users to specify unique arrangements of musical instruments for each section of the digital musical score. Optionally, the rearrangement of the order of musical instruments in the vertical alignment is based on at least one of: a type of the musical instruments, a number of notations per instrument, and so forth. Optionally, the order of musical instruments may be rearranged automatically according to standard orchestral convention, when the musical instruments are added in the previously-created section. Optionally, the musical instruments may be marked as soloists, which will be positioned accordingly on the score. Optionally, along with the correct ordering the musical instrument families may also be bracketed together accurately too. Optionally, the editing of the new section or the previously-created section may enable the user to disable the musical instruments that may not be required.

In some embodiments, the edit required in the new section or in the previously-created section comprises the adjustment of a spacing between notations of different musical instruments in the vertical alignment. Suitably, the method enables the editing of the spacing between notations of different musical instruments in the vertical alignment, thereby eliminating the large gap therebetween and improving the readability. Optionally, the method may employ an automatic spacing algorithm that may pick the best-possible default layout to suit the page size and ensemble type of the new section. Optionally, the spacing may be edited to update the page margins according to the published digital musical scores.

In some embodiments, the method further comprising indicating, on the interactive user interface, a section in which the edit is being implemented for modifying the digital musical score. Suitably, the step of indicating the section in which the edit is being implemented makes the method user-friendly. Optionally, the section that is indicated may be either the new section that is created, or the previously-created section that is selected.

The method comprises modifying, using the at least one processor, the digital musical score for implementing the edit in the new section or in the previously-created section. Suitably, after making the is required edits the method enables implementation of the said edits in the new section or in the previously-created section, thereby causing the modification of the digital musical score. In an implementation, the method of editing the digital musical score may enable a musical composer writing an opera to easily create highly detailed part scores that are automatically split into sections, where accompanying musical instruments may be enabled or disabled in each section. For example, during an opera performance, wherein the opera comprising four sections, a singer may be required to perform during section 2 and section 4 but not during section 1 and section 3. In the above example, the method enables the piano part scores to be displayed for section 4 but not for sections 1, 2 and 3 during the opera performance.

In some embodiments, when the digital musical score that is to be edited is associated with another digital musical score, the method further comprises automatically modifying the other digital musical score for also implementing the edit in a section corresponding to the new section or the previously-created section of the digital musical score, upon the step of modifying the digital musical score. In this regard, when the digital musical score includes a section 1 and a section 2, then method enables the section 2 to get modified automatically based on the editing done in the section 1. Advantageously, the aforementioned step saves the user's time and effort of repeating the steps of editing the digital musical score again and again. Moreover, the method ensures that the part scores automatically reflect the changes, or the edits being made in the full score. For example, when the flute was included in section 1 but excluded from section 2 in the full score. Then, the flute part score would simply display music for section 1 and would automatically show nothing for section 2, apart from the title and the word 'Tacet' (a standard convention). The aforementioned step supports the automatic formatting of the full score, thereby saving the time and efforts of the user.

A second aspect of the disclosure provides a system for editing a digital musical score, the system comprising at least one processor configured to: receive the digital musical score that is to be edited, wherein the digital musical score includes musical notations associated with at least one musical instrument in vertical alignment, receive a first input indicative of one of: creation a new section in the digital musical score, selection of a previously-created section in the digital musical score, via an interactive user interface rendered on a user device associated with a user, receive a second input indicative of an edit required in the new section or in the previously-created section, via the interactive user interface and modify the digital musical score to implement the edit in the new section or in the previously-created section.

Suitably, the system comprises at least one processor. The term "at least one processor" as used herein refers to an application, program, process or device that responds to requests for information or services by another application, program, process or device (such as the external device) via a network interface. Optionally, the at least one processor may be on the user device. Optionally, the at least one processor may be external to the user device. Optionally, the at least one processor also encompasses software that makes the act of serving information or providing services possible. Optionally, it may be evident that the communication means of the external device may be compatible with a communication means of the at least one processor, in order to facilitate communication therebetween. It will be appreciated that optionally the processor includes, but is not limited to, a microprocessor, a microcontroller, a complex instruction set computing (CISC) microprocessor, a reduced instruction set computer (RISC) microprocessor, a very long instruction word (VLIW) microprocessor, or any other type of processing circuit. Optionally, the term "processor" may refer to one or more individual processors, processing devices and various elements associated with the system. Optionally, the one or more individual processors, processing devices and elements are arranged in various architectures for responding to and processing the instructions that drive the system.

In some embodiments, the edit required in the new section or in the previously-created section comprises at least one of: addition of notations associated with a musical instrument, removal of notations associated with a musical instrument, modification of notations associated with a musical instrument, rearrangement of an order of musical instruments in the vertical alignment, adjustment of a spacing between notations of different musical instruments in the vertical alignment.

In some embodiments, the at least one musical instrument is a part score or a full score.

In some embodiments, when receiving the digital musical score, the at least one processor is configured to: create the digital musical score, based on at least one third input provided by the user or receive the digital musical score from a device at which the digital musical score is stored, the device being communicably coupled to the at least one processor. Suitably, the system further comprises the device at which the digital musical score is stored. Advantageously, the device enables the user to retrieve any version of the digital musical score whenever required. Beneficially, the device enables the user to retrieve an older version when the new edits are not required. Optionally, at the device, there is stored a historical record of editing performed on the digital musical score. Optionally, the historical record may comprise multiple versions of the digital musical score. Optionally, the multiple versions may include an original version or at least one edited version.

In some embodiments, the first input is at least one of: a selection of a user interface element, inputted values in a user interface element, a partition element drawn over the digital musical score.

In some embodiments, the second input is at least one of: a selection of a user interface element, a drag and drop of a user interface element, inputted values in a user interface element.

In some embodiments, when the digital musical score that is to be edited is associated with another digital musical score, the at least one processor is further configured to automatically modify the other digital musical score to also implement the edit in a section corresponding to the new section or the previously-created section of the digital musical score, upon modifying the digital musical score.

In some embodiments, the at least one processor is further configured to indicate, on the interactive user interface, a section in which the edit is being implemented for modifying the digital musical score.

A third aspect of the disclosure provides a computer program product for editing a digital musical score, the computer program product comprising a non-transitory machine-readable data storage medium having stored thereon program instructions that, when executed by a processing device, cause the processing device to: receive the digital musical score that is to be edited, wherein the digital musical score includes musical notations associated with at least one musical instrument in vertical alignment, receive a first input indicative of one of: creation a new section in the digital musical score, selection of a previously-created section in the digital musical score, via an interactive user interface rendered on a user device associated with a user, receive a second input indicative of an edit required in the new section or in the previously-created section, via the interactive user interface and modify the digital musical score to implement the edit in the new section or in the previously-created section.

Optionally, the computer program product is implemented as an algorithm, embedded in a software stored in the non-transitory machine-readable data storage medium. The non-transitory machine-readable data storage medium may include, but is not limited to, an electronic storage device, a magnetic storage device, an optical storage device, an electromagnetic storage device, a semiconductor storage device, or any suitable combination of the foregoing. Examples of implementation of the computer-readable medium include, but are not limited to, Electrically Erasable Programmable Read-Only Memory (EEPROM), Random Access Memory (R.A.M), Read Only Memory (ROM), Hard Disk Drive (HDD), Flash memory, a Secure Digital (SD) card, Solid-State Drive (SSD), a computer readable storage medium, and/or CPU cache memory.

In some embodiments, the edit required in the new section or in the previously-created section comprises at least one of: addition of notations associated with a musical instrument, removal of notations associated with a musical instrument, modification of notations associated with a musical instrument, rearrangement of an order of musical instruments in the vertical alignment, adjustment of a spacing between notations of different musical instruments in the vertical alignment.

In some embodiments, the at least one musical instrument is a part score or a full score.

In some embodiments, the step of receiving the digital musical score comprises: creating the digital musical score, based on at least one third input provided by the user; or receiving the digital musical score from a device at which the digital musical score is stored.

In some embodiments, the first input is at least one of: a selection of a user interface element, inputted values in a user interface element, a partition element drawn over the digital musical score.

In some embodiments, the second input is at least one of: a selection of a user interface element, a drag and drop of a user interface element, inputted values in a user interface element.

In some embodiments, when the digital musical score that is to be edited is associated with another digital musical score, the program instructions, when executed by the processing device, further cause the processing device to automatically modify the other digital musical score to also implement the edit in a section corresponding to the new section or the previously-created section of the digital musical score, upon modifying the digital musical score.

In some embodiments, the processing device is further caused to indicate, on the interactive user interface, a section in which the edit is being implemented for modifying the digital musical score.

Throughout the description and claims of this specification, the words "comprise" and "contain" and variations of the words, for example "comprising" and "comprises", mean "including but not limited to", and do not exclude other components, integers or steps. Moreover, the singular encompasses the plural unless the context otherwise requires: in particular, where the indefinite article is used, the specification is to be understood as contemplating plurality as well as singularity, unless the context requires otherwise.

Preferred features of each aspect of the disclosure may be as described in connection with any of the other aspects. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the disclosure will now be described, by way of example only, with reference to the accompanying drawings, in which.

DETAILED DESCRIPTION

Figure 1:
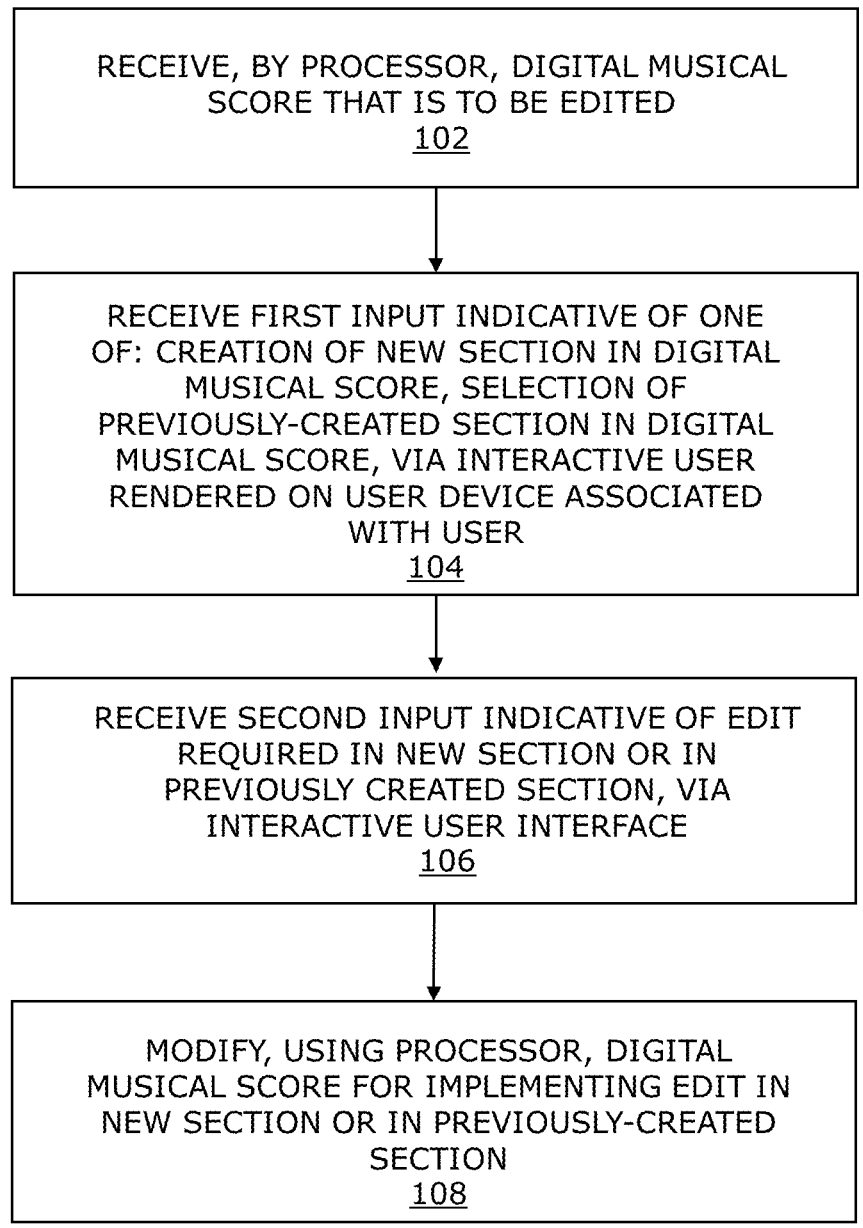
FIG. 1 is a flowchart depicting steps of a computer-implemented method for editing a digital musical score, in accordance with an embodiment of the present disclosure.

Referring to FIG. 1, illustrated is a flowchart depicting steps of a computer-implemented method for editing a digital musical score, in accordance with an embodiment of the present disclosure. At step 102, the digital musical score that is to be edited is received by at least one processor, wherein the digital musical score includes musical notations associated with at least one musical instrument in vertical alignment. At step 104, a first input indicative of one of: creation of a new section in the digital musical score, selection of a previously-created section in the digital musical score, is received via an interactive user interface rendered on a user device associated with a user. At step 106, a second input indicative of an edit required in the new section or in the previously-created section, is received via the interactive user interface. At step 108, digital musical score is modified, using the at least one processor, for implementing the edit in the new section or in the previously-created section.

The aforementioned steps are only illustrative and other alternatives can also be provided where one or more steps are added, one or more steps are removed, or one or more steps are provided in a different sequence without departing from the scope of the claims herein.

Referring to FIGS. 2A, 2B, 2C and 2D, illustrated are views of an interactive user interface 200 pertaining to a system for editing a digital musical score 202, in accordance with different embodiments of the present disclosure. The digital musical score 202 that is to be edited is shown on the interactive user interface 200, wherein the digital musical score 202 includes musical notations 204 associated with at least one musical instrument in vertical alignment. A first input indicative of one of: creation of a new section in the digital musical score, selection of a previously-created section in the digital musical score, is received via the interactive user interface 200. The interactive user interface 200 is rendered on a user device associated with a user.

Figure 2A:
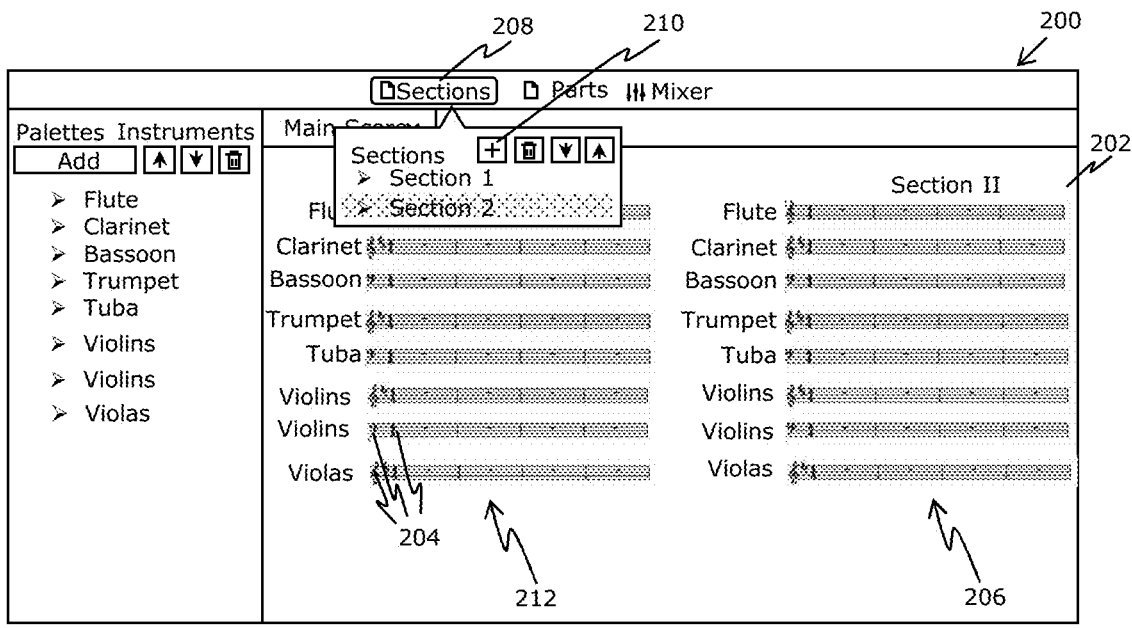
FIGS. 2A, 2B, 2C and 2D illustrate views of an interactive user interface pertaining to a system for editing a digital musical score, in accordance with different embodiments of the present disclosure.

FIG. 2A illustrates creation of a new section 206 in the digital musical score 202, in accordance with an embodiment of the present disclosure. As shown, the interactive user interface 200 comprises a sections tab 208, wherein providing the first input creates the new section 206. The first input is at least one of: a selection of a user interface element, inputted values in a user interface element, a partition element drawn over the digital musical score. As shown in the FIG. 2A, the first input is implemented as clicking of a '+' button 210 which creates the new section 206 in the digital musical score 202.

Figure 2B:
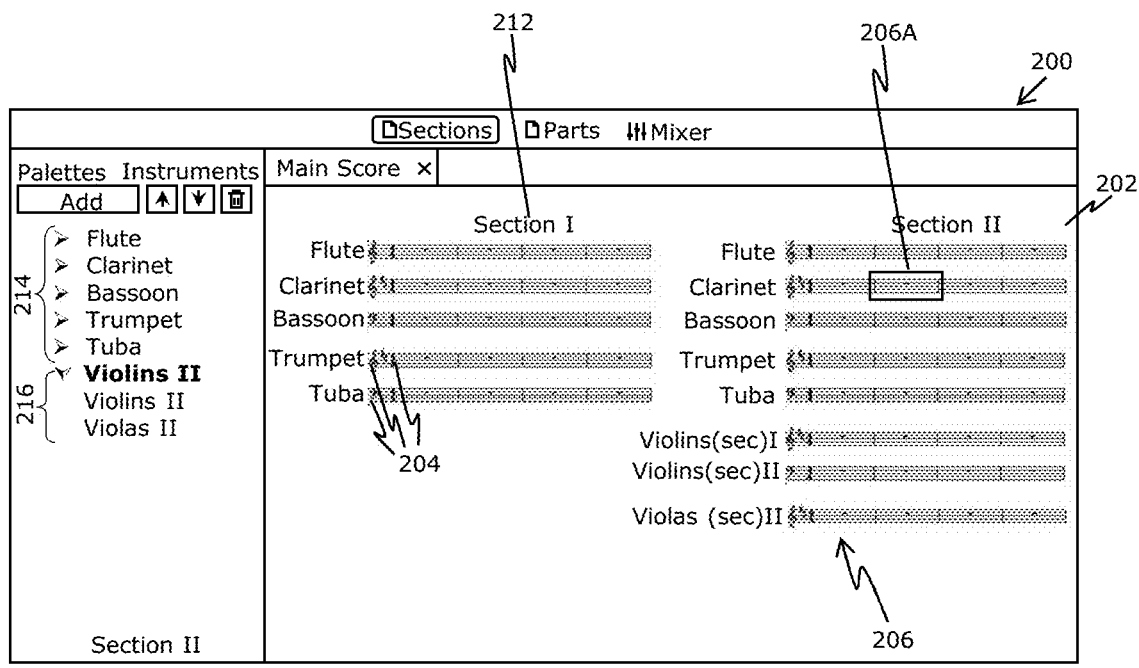

FIG. 2B illustrates editing of the digital musical score 202, in accordance with an embodiment of the present disclosure. As shown, a previously-created section 212 in the digital musical score 202 is being edited. The previously-created section 212 in the digital musical score 202 is edited by receiving a second input indicative of an edit required in the previously-created section 212 via the interactive user interface 200. It will be appreciated that an entirety of the digital musical score 202 may be edited. While editing, instruments can be enabled and disabled within the digital musical score 202. As shown in the FIG. 2B, a first set of instruments 214 are enabled, since they are being utilized in the digital musical score 212. The first set of instruments 214 which are enabled include: a flute, a clarinet, a bassoon, a trumpet and a tuba, which have been assigned the musical notations 204 in the digital musical score 212. As shown in the FIG. 2B, a second set of instruments 216 are enabled for the new section 206 but disabled for a previously-created section 212 by receiving the second input such as selecting a part 206A of the new section 206. The second set of instruments 216 which are disabled include a set of violins. In this regard, as shown, when the second set of instruments 216 are disabled, the layout of the previously-created section 212 is updated automatically.

Figure 2C:
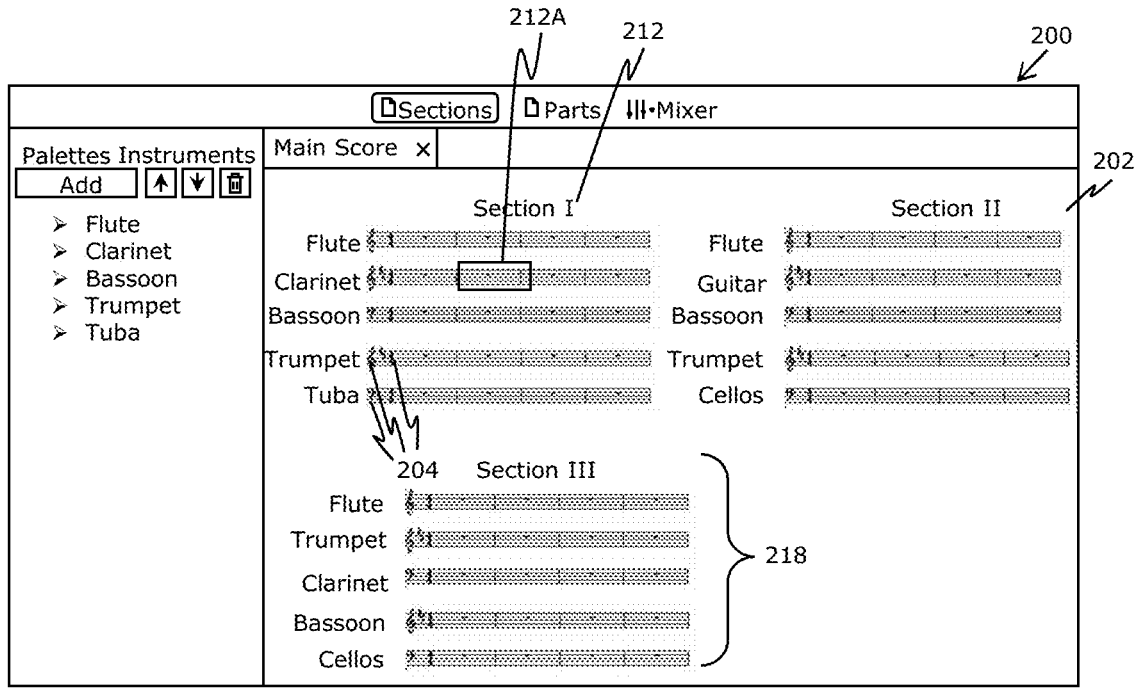

FIG. 2C illustrates editing of the digital musical score 202, in accordance with another embodiment of the present disclosure. As shown, a previously-created section 212 in the digital musical score 202 is being edited. The previously-created section 212 in the digital musical score 202 is edited by receiving a second input indicative of an edit required in the previously-created section 212 via the interactive user interface 200. Herein, the second input is selecting a part 212A of the previously-created section 212 and editing the vertical arrangement of the instruments. It will be appreciated that an entirety of the digital musical score 202 may be edited. Herein, the digital musical score 202 that is to be edited is associated with another digital musical score. The other digital musical score is automatically modified for implementing the edit in a section (implemented as Section III 218) corresponding to the previously-created section 212 of the digital musical score 202, upon the step of modifying the digital musical score 202. As shown, the instrument tuba is replaced with the instrument cellos and the order of the instruments in the section 218 is also rearranged. The section 218 represents a final edited version of the digital musical score 202.

Figure 2D:
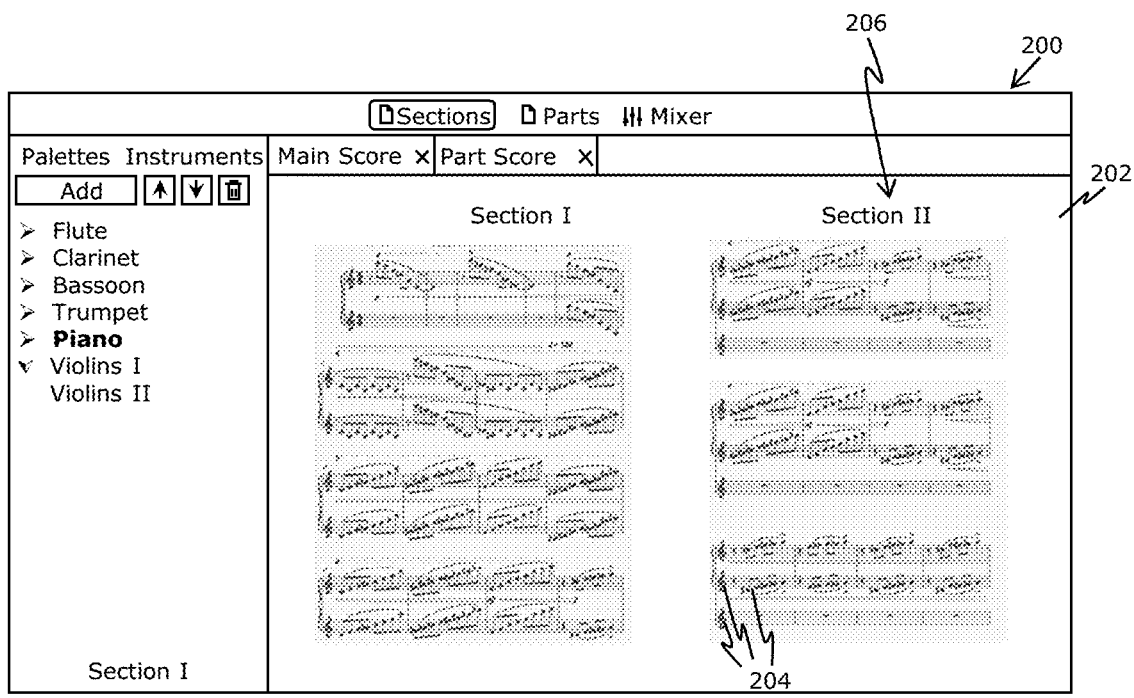

FIG. 2D illustrates selection of instruments in the digital musical score 202, in accordance with an embodiment of the present disclosure. Herein, an edit required in a new section 206 and/or a previously-created section 212 comprises editing a part score. As shown, when the user selects the piano part score then only the piano part is visible on the digital musical score 202. Moreover, as shown, the user has specified that the Violins 1 instrument should be visible for section 2 but not for section 1.

FIGS. 2A, 2B, 2C and 2D are merely examples, which should not unduly limit the scope of the claims herein. A person skilled in the art will recognize many variations, alternatives, and modifications of embodiments of the present disclosure.

Figure 3:
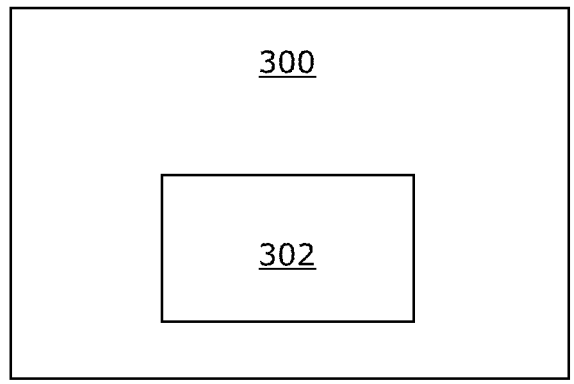
FIG. 3 illustrates a block diagram of a system for editing a digital musical score, in accordance with an embodiment of the present disclosure.

Referring to FIG. 3, illustrated is a block diagram of a system 300 for editing a digital musical score, in accordance with an embodiment of the present disclosure. As shown, the system 300 comprises at least one processor (implemented herein as a processor 302), which is configured to modify the digital musical score to implement an edit in a given section.

Figure 4:
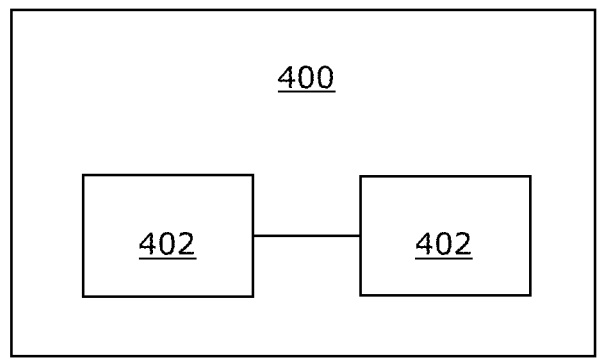
FIG. 4 illustrates a block diagram of a system for editing a digital musical score, in accordance with another embodiment of the present disclosure.

Referring to FIG. 4, illustrated is a block diagram of a system 400 for editing a digital musical score, in accordance with another embodiment of the present disclosure. As shown, the system 400 comprises at least one processor (implemented herein as a processor 402), and a user device 404. The processor 402 and the user device 404 are communicably coupled to each other. The processor 402 is configured to modify the digital musical score to implement an edit in a given section. The user device 404 is implemented as at least one of: a part of the system 400, external to the system 400. As shown in the FIG. 4, the external device 404 is implemented as a part of the system 400.

FIGS. 3 and 4 are merely examples, which should not unduly limit the scope of the claims herein. A person skilled in the art will recognize many variations, alternatives, and modifications of embodiments of the present disclosure.

What is claimed is:

1. A computer-implemented method for editing a digital musical score, the method comprising:
    receiving, by at least one processor, the digital musical score that is to be edited, wherein the digital musical score includes musical notations associated with at least one musical instrument in vertical alignment;
    receiving a first input indicative of one of: creation of a new section in the digital musical score, selection of a previously-created section in the digital musical score, via an interactive user interface rendered on a user device associated with a user;
    receiving a second input indicative of an edit required in the new section or in the previously-created section, via the interactive user interface;
    modifying, using the at least one processor, the digital musical score for implementing the edit in the new section or in the previously-created section, and
    implementing the edit in the new section in the digital musical score or in the previously-created section in the digital musical score, after making the edit, thereby modifying the digital musical score,
    wherein the edit required in the new section or in the previously-created section comprises adjustment of a spacing between notations of different musical instruments in the vertical alignment.

2. The computer-implemented method of claim 1, wherein the edit required in the new section or in the previously-created section comprises at least one of:
    addition of notations associated with a musical instrument;
    removal of notations associated with a musical instrument;
    modification of notations associated with a musical instrument; and
    rearrangement of an order of musical instruments in the vertical alignment.

3. The computer-implemented method of claim 1, wherein the digital musical score is a part score or a full score.

4. The computer-implemented method of claim 1, wherein the step of receiving the digital musical score comprises:
    creating the digital musical score, based on at least one third input provided by the user; or
    receiving the digital musical score from a device at which the digital musical score is stored.

5. The computer-implemented method of claim 1, wherein the first input is at least one of: a selection of a user interface element, inputted values in a user interface element, a partition element drawn over the digital musical score.

6. The computer-implemented method of claim 1, wherein the second input is at least one of: a selection of a user interface element, a drag and drop of a user interface element, inputted values in a user interface element.

7. The computer-implemented method of claim 1, wherein when the digital musical score that is to be edited is associated with another digital musical score, the method further comprises automatically modifying the other digital musical score for also implementing the edit in a section corresponding to the new section or the previously-created section of the digital musical score, upon the step of modifying the digital musical score.

8. The computer-implemented method of claim 1, further comprising indicating, on the interactive user interface, a section in which the edit is being implemented for modifying the digital musical score.

9. A system for editing a digital musical score, the system comprising at least one processor configured to:
    receive the digital musical score that is to be edited, wherein the digital musical score includes musical notations associated with at least one musical instrument in vertical alignment;
    receive a first input indicative of one of: creation a new section in the digital musical score, selection of a previously-created section in the digital musical score, via an interactive user interface rendered on a user device associated with a user;
    receive a second input indicative of an edit required in the new section or in the previously-created section, via the interactive user interface;
    modify the digital musical score to implement the edit in the new section or in the previously-created section, and
    implement the edit in the new section or in the previously-created section after making the edit, thereby modifying the digital musical score,
    wherein the edit required in the new section or in the previously-created section comprises adjustment of a spacing between notations of different musical instruments in the vertical alignment.

10. The system of claim 9, wherein the edit required in the new section or in the previously-created section comprises at least one of:
    addition of notations associated with a musical instrument;
    removal of notations associated with a musical instrument;
    modification of notations associated with a musical instrument; and
    rearrangement of an order of musical instruments in the vertical alignment.

11. The system of claim 9, wherein when receiving the digital musical score, the at least one processor is configured to:
    create the digital musical score, based on at least one third input provided by the user; or
    receive the digital musical score from a device at which the digital musical score is stored, the device being communicably coupled to the at least one processor.

12. The system of claim 9, wherein when the digital musical score that is to be edited is associated with another digital musical score, the at least one processor is further configured to automatically modify the other digital musical score to also implement the edit in a section corresponding to the new section or the previously-created section of the digital musical score, upon modifying the digital musical score.

13. A computer program product for editing a digital musical score, the computer program product comprising a non-transitory machine-readable data storage medium having stored thereon program instructions that, when executed by a processing device, cause the processing device to:
    receive the digital musical score that is to be edited, wherein the digital musical score includes musical notations associated with at least one musical instrument in vertical alignment;
    receive a first input indicative of one of: creation a new section in the digital musical score, selection of a previously-created section in the digital musical score, via an interactive user interface rendered on a user device associated with a user;
    receive a second input indicative of an edit required in the new section or in the previously-created section, via the interactive user interface;
    modify the digital musical score to implement the edit in the new section or in the previously-created section; and
    implement the edit in the new section in the digital musical score or in the previously-created section in the digital musical score, after making the edit, thereby modifying the digital musical score,
wherein the edit required in the new section or in the previously-created section comprises adjustment of a spacing between notations of different musical instruments in the vertical alignment.

14. The computer program product of claim 13, wherein the edit required in the new section or in the previously-created section comprises at least one of:
    addition of notations associated with a musical instrument;
    removal of notations associated with a musical instrument;
    modification of notations associated with a musical instrument; and
    rearrangement of an order of musical instruments in the vertical alignment.

15. The computer program product of claim 13, wherein when the digital musical score that is to be edited is associated with another digital musical score, the program instructions, when executed by the processing device, further cause the processing device to automatically modify the other digital musical score to also implement the edit in a section corresponding to the new section or the previously-created section of the digital musical score, upon modifying the digital musical score.

* * * * *